Sept. 13, 1932.　　　　C. C. ALVORD　　　　1,876,573

SPOOL TENSION SPRING FOR TUFT FRAMES

Filed May 21, 1930

INVENTOR
Charles C. Alvord

Patented Sept. 13, 1932

1,876,573

UNITED STATES PATENT OFFICE

CHARLES CLINTON ALVORD, OF WORCESTER, MASSACHUSETTS, ASSIGNOR TO WORCESTER LOOM WORKS, OF WORCESTER, MASSACHUSETTS

SPOOL TENSION SPRING FOR TUFT FRAMES

Application filed May 21, 1930. Serial No. 454,364.

This invention relates to tuft frames such as are used in weaving tufted fabrics and is intended to provide an improved type of tension spring for the spools upon which the tuft yarns are wound, and which may be securely held in place on the tuft frame by the same screws which hold the spool bearing. A further object contemplates the piercing of holes through the body of the spring and in alignment with the spool bearing attaching screws so that the latter may be inserted and tightened without the removal of the tension spring. Another object is the improved method of fastening and the means of preventing the holding screws from working loose. A still further object contemplates a marked reduction in the possible side shake of the spring at its point of contact with the spool head thus tending to avoid "low rows" in the fabric.

These and other features of the invention will be explained in the following specification and will be defined in the claims hereto annexed.

Figures 1, 2:
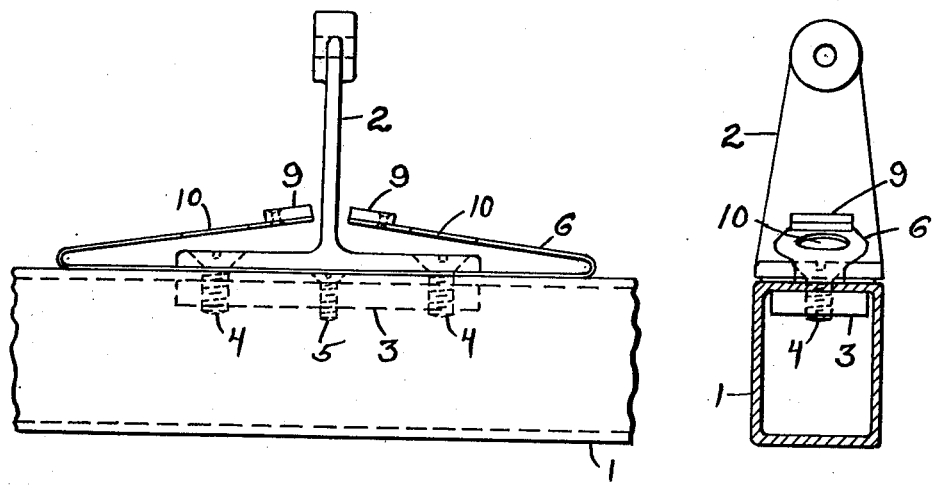
Figure 3:
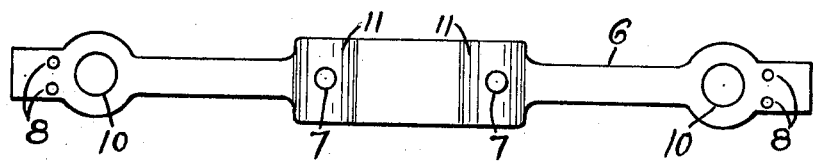
Figure 4:
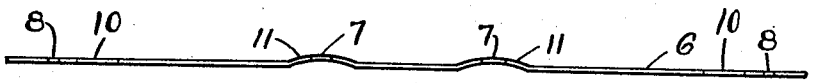

In the drawing Fig. 1 is a full sized elevation showing my improved tension spring attached to a tuft frame; Fig. 2 is a side view of Fig. 1; Fig. 3 illustrates a spring blank before bending; and Fig. 4 is a front view of Fig. 3.

Referring to Figs. 1 and 2 the well known hollow rectangular tubing or carrier bar of a tuft frame is shown at 1 upon which is mounted a yarn spool bearing 2. Since the wall of the tubing is relatively thin a holding plate 3 is provided being fastened inside the rectangular tube directly beneath the spool bearing so it can receive the two screws 4 which hold on the spool bearing. This plate is much thicker than the wall of the tubing and therefore relatively larger screws can be used and tightened up more firmly than if the screws were held only by a tapped hole in the wall of the tubing. The holding plate 3 is secured in place preferably by flat head screw 5 which cannot work loose as long as the spool bearing is in place over it.

Heretofore it has been the custom to attach the two tension springs, required for each spool which has a bearing, to the rectangular tubing by four small screws, see Jenckes et al, 1,551,747 of Sept. 1, 1925. Such a construction is not only costly due to the time necessary to drill and tap the holes, the cost of the screws and the labor of screwing them into place but is also unsatisfactory on account of the frequent stripping of the threads of the small sized screws necessarily used. Moreover, the screws fit their tapped holes quite loosely and are thus liable to rattle loose while in use on the loom. To overcome these defects I have combined the two springs into one, and pass it beneath the spool bearing where it is registered and secured by the screws which hold the spool bearing to the carrier bar. Fig. 3 shows a view of my tension spring 6 as blanked out before being bent to final shape, holes 7 being located to register with the screw holes in the spool bearing.

Small holes 8 are for the rivets used to hold on the friction pads 9 which are usually of leather, while large holes 10 will, when the spring has been formed up, be in alignment with screws 4 so that the latter may be inserted freely through the large holes and tightened in place.

In the above-mentioned Jenckes et al patent it may be seen that the conventional method of attaching the spool springs by screws is employed. Obviously the screw holes must be at least .005" larger than the diameter of the screws, so, therefore, if one of the two attaching screws becomes slightly loosened, as is often the case, the spring is apt to oscillate slightly about the tighter of the two screws as a fulcrum. Thus, since it is about ten times as far from the leather pad to the first of the two screws as it is between the two screws it follows that, due to the .005" clearance, there is a possible side shake of .060" at the point of the spring where it contacts the spool head. Such shake would be increased if both screws were loose. This is an objectionable condition as, should the spring be standing at its extreme rear position and then accidentally be contacted and swung around to its extreme front position it would rotate the spool which it was contacting and wind back the depending yarn ends not less than .060", provided the spool in question was a fully wound one of average diameter. This would result in a "low row" in the fabric, if such displacement occurred during weaving operations, i. e. one leg of the tuft would be 1/16" below the other, a serious defect. My unique construction overcomes such a defect for it is seen that, since the contact point with the spool lies at a point between the two attaching screws, there must be less side shake at such intermediate point than there is clearance in the screw holes. In the spring shown in the drawing if there is .005" clearance for the screws, as in the above case, there will be only about .003" side shake at the contact point, a negligible amount of shake.

Since a tuft frame is subject to much vibration and jarring there is always the possibility that the various screws will work loose, allowing important parts of the frame to drop off. For instance, if screws 4 should loosen up the yarn spool bearing might shift sufficiently to allow one or both of the yarn spools to fall out. Such an accident would cause serious delay for repairs, would probably injure other tuft frames on the loom and spoil the fabric being woven. To preclude the possibility of screws 4 becoming loose I form bends 11 in spool tension spring 6, as shown in Fig. 4, surrounding the screw holes 7 which bends act similarly to spring lock washers upon the retaining screws 4. Tightening up screws 4 so as to seat them home as in Fig. 1 flattens out these bends in the spring, and since the screws are thus subject to an axial pressure due to the deformation of the bends there is no chance of the screws rattling loose.

In the well known single type of tension spring held by its own individual screws there is more or less axial pressure exerted on the screws when the spring is flexed but none when unflexed while with my spring the pressure is constant whether the spring proper is flexed or not.

While I have shown one good form of my invention I wish it understood that various modifications may be made without departing from the spirit of the invention.

What I claim is:

1. As a new article of manufacture a tension spring for a tuft frame adapted to receive at least two yarn spools, said spring being shaped to afford independent braking contacts on the adjacent heads of two contiguous spools.

2. The combination with a yarn spool bearing superposed on the inactive body portion of a tension spring shaped to provide independent braking contacts on the adjacent heads of two contiguous spools of a holding plate adapted to be fastened inside a tuft frame carrier bar to receive the holding screws employed to fasten said bearing to the carrier bar.

3. A tension spring shaped to afford independent braking contacts on the adjacent heads of two contiguous tuft frame spools and provided with screw holes whereby it may be attached to a tuft frame, said spring being shaped to exert axial tension on the holding screws when fully tightened whereby the screws are prevented from working loose.

4. As a new article of manufacture a tension spring for a tuft frame adapted to be secured to said frame by two attaching screws in position to contact the head of a spool journalled on said frame, the contact point being between said attaching screws.

5. A tension spring for a tuft frame adapted to contact a spool head on said frame, said spring being pierced with holes to permit screw attachment of the spring to the frame, said holes being so situated with respect to said contact point that side shake at the contact point is minimized, whereby low rows in the tufted fabric may be eliminated.

6. A spool tension spring for a tuft yarn frame comprising an inactive body portion pierced with two screw holes for attachment to a tuft frame, said spring being provided with two spring arms extending outwardly from and then bent inwardly over said inactive body portion, said arms each being provided with a hole in alignment with the corresponding screw hole in the body portion.

7. In a tuft yarn frame, a carrier member, a spool tension spring mounted on the outer surface of said member, a yarn spool bearing superposed upon the inactive body portion of said spring and attaching screws passing through spring and bearing and securing both to the carrier member.

8. As a new article of maufacture, a tension spring for a tuft frame adapted to be registered in position on and secured to said tuft frame at two spaced-apart points and to afford braking contact on a tuft frame spool head at a third point, said points being so situated that the distance from the braking contact point to either of the said spaced-apart points is less than the distance between the two spaced-apart points.

In testimony whereof I affix my signature.

CHARLES CLINTON ALVORD.